United States Patent
Shvetsov et al.

(10) Patent No.: US 11,388,286 B2
(45) Date of Patent: Jul. 12, 2022

(54) SYSTEM AND METHOD FOR HANDLING UNWANTED TELEPHONE CALLS

(71) Applicant: AO Kaspersky Lab, Moscow (RU)

(72) Inventors: Dmitry V. Shvetsov, Moscow (RU); Daniil A. Yazovsky, Moscow (RU); Vitaly S. Vorobiov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 17/335,123

(22) Filed: Jun. 1, 2021

(65) Prior Publication Data

US 2022/0094784 A1 Mar. 24, 2022

(30) Foreign Application Priority Data

Sep. 24, 2020 (RU) .............. RU2020131448

(51) Int. Cl.
  *H04M 3/436* (2006.01)
  *H04M 3/22* (2006.01)
  *G10L 15/14* (2006.01)
  *G06N 20/10* (2019.01)
  *H04M 3/53* (2006.01)

(52) U.S. Cl.
  CPC .......... *H04M 3/436* (2013.01); *G06N 20/10* (2019.01); *G10L 15/14* (2013.01); *H04M 3/2218* (2013.01); *H04M 3/5307* (2013.01)

(58) Field of Classification Search
  CPC .. H04M 3/436; H04M 3/2218; H04M 3/5307; H04M 3/5233; H04M 3/42; H04M 7/1245; H04M 7/1255; H04M 2203/405; H04M 3/5238; H04M 15/47; H04M 15/8061; H04M 2201/18; H04M 2201/41; H04M 2203/6027; H04M 2203/6054; H04M 3/42068; H04M 3/523; H04M 3/5235; H04M 2201/12; H04M 2201/36; H04M 3/51; H04M 7/0078; H04M 2201/40; H04M 2203/402; H04M 2207/203; H04M 3/2281; H04M 3/42178; H04M 3/42221;

(Continued)

(56) References Cited

U.S. PATENT DOCUMENTS 8,300,798 B1 * 10/2012 Wu .................. H04M 3/5233
  379/265.14
8,583,078 B2 * 11/2013 Sweeney .............. H04W 12/08
  455/457

(Continued)

*Primary Examiner* — Akelaw Teshale
(74) *Attorney, Agent, or Firm* — ArentFox Schiff LLP; Michael Fainberg

(57) ABSTRACT

Disclosed herein are systems and methods for handling unwanted telephone calls. In one aspect, an exemplary method comprises, intercepting a call request for a call from a terminal device of a calling party to a terminal device of a called party, generating a call recording containing media data transmitted within a connection established by the intercepted call request, determining attributes of the generated call recording, classifying the call as an unwanted call based on the determined attributes, wherein the classification is performed by a classifier trained on previously collected unwanted calls, and wherein the call is classified as unwanted when the attributes belong to an unwanted call class that is known, and handling the call in accordance with the classification of the call, the handling including at least securing information of the call.

18 Claims, 5 Drawing Sheets

(58) Field of Classification Search
CPC ...... H04M 3/493; H04M 3/5175; H04M 7/00; G06N 20/10; G10L 15/14
See application file for complete search history.

(56) References Cited

U.S. PATENT DOCUMENTS

| | | | | |
|---|---|---|---|---|
| 9,232,052 | B1* | 1/2016 | Flaks | H04M 3/38 |
| 9,614,863 | B2* | 4/2017 | Kim | H04L 63/1408 |
| 10,194,023 | B1* | 1/2019 | Kong | H04M 7/0069 |
| 10,326,886 | B1* | 6/2019 | John Chuan | H04L 65/105 |
| 10,715,658 | B1* | 7/2020 | Isgar | H04M 3/42025 |
| 10,757,252 | B1* | 8/2020 | Quilici | H04M 1/573 |
| 10,798,241 | B1* | 10/2020 | Quilici | H04M 3/2281 |
| 10,924,609 | B1* | 2/2021 | Piscopo, Jr. | H04M 3/42102 |
| 10,958,780 | B1* | 3/2021 | Zhao | H04M 15/00 |
| 11,050,879 | B1* | 6/2021 | Welch | H04M 3/42059 |
| 11,102,347 | B1* | 8/2021 | Isgar | H04M 3/42382 |
| 2004/0034875 | A1* | 2/2004 | Bulkowski | H04N 21/8586 348/E7.071 |
| 2005/0221840 | A1 | 10/2005 | Yamamoto et al. | |
| 2007/0036314 | A1 | 2/2007 | Kloberdans et al. | |
| 2007/0039040 | A1* | 2/2007 | McRae | H04L 51/12 726/4 |
| 2007/0041372 | A1* | 2/2007 | Rao | H04L 65/1079 370/356 |
| 2007/0116210 | A1* | 5/2007 | Li | H04N 21/4882 348/E7.069 |
| 2009/0217035 | A1* | 8/2009 | Abdul Hameed Khan | G06Q 20/3829 713/168 |
| 2014/0047074 | A1* | 2/2014 | Chung | H04L 67/32 709/219 |
| 2015/0187019 | A1* | 7/2015 | Fernandes | G06Q 40/08 705/4 |
| 2017/0019534 | A1* | 1/2017 | Qin | H04M 3/2218 |
| 2017/0142252 | A1* | 5/2017 | Bhupati | H04M 3/2281 |
| 2018/0013881 | A1* | 1/2018 | Cooper | H04M 3/4365 |
| 2019/0325345 | A1* | 10/2019 | Baracaldo Angel | G06N 20/00 |
| 2020/0143822 | A1 | 5/2020 | Carriero et al. | |
| 2021/0092222 | A1* | 3/2021 | Kang | H04M 3/42221 |
| 2021/0203780 | A1* | 7/2021 | Welch | H04M 3/42059 |
| 2021/0264897 | A1* | 8/2021 | Churaev | G10L 15/197 |

* cited by examiner

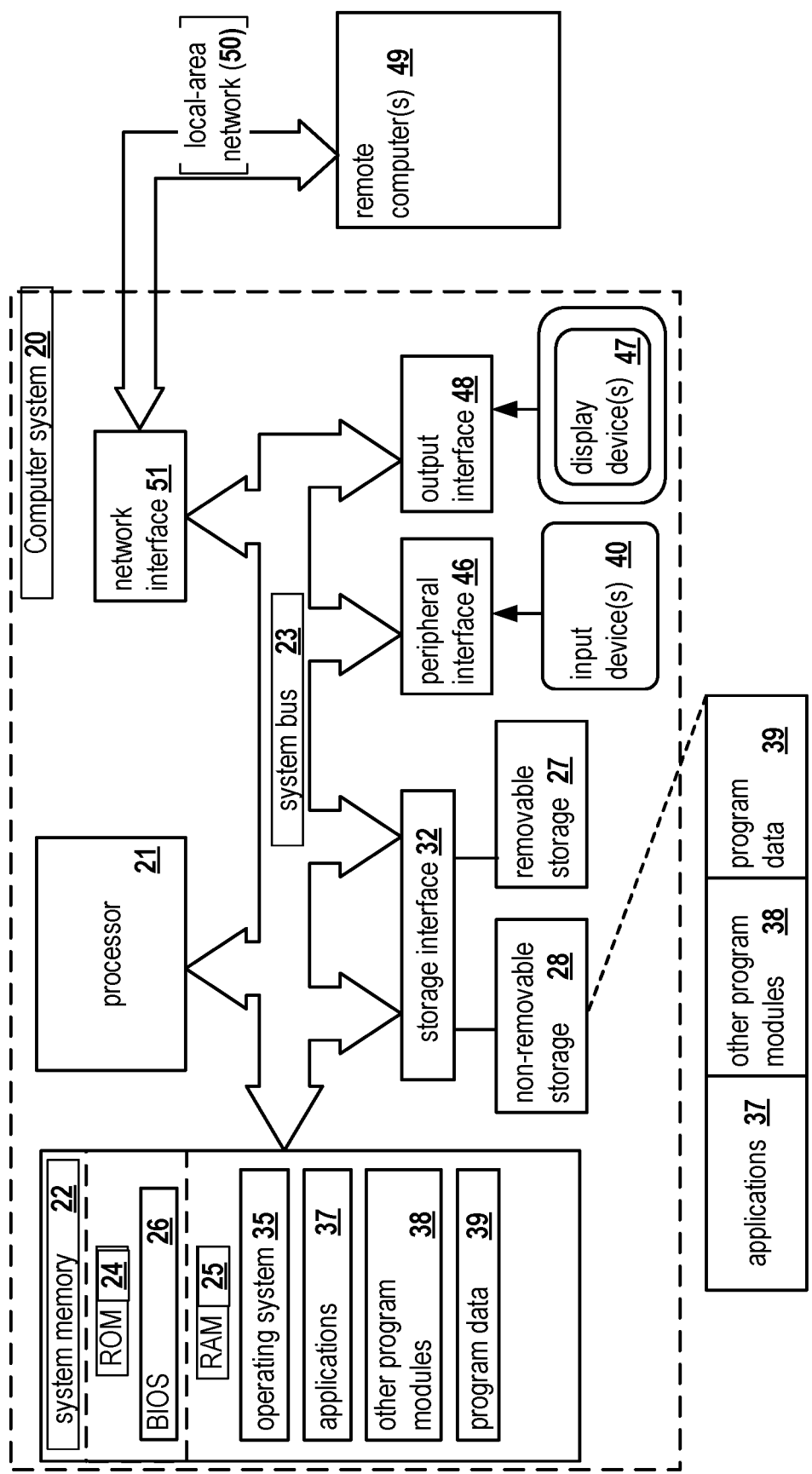

SYSTEM AND METHOD FOR HANDLING UNWANTED TELEPHONE CALLS

CROSS REFERENCE TO RELATED APPLICATIONS

The present application claims priority to Russian Patent Application No. 2020131448, filed on Sep. 24, 2020, the entire content of which is incorporated herein by reference.

FIELD OF TECHNOLOGY

The present disclosure relates to the field of information security, and specifically, to systems and method for handling unwanted telephone calls, e.g., by earlier termination of unwanted calls that use spoofing and similar fraud schemes.

BACKGROUND

At present, almost all owners of a universal mobile device (such as a mobile phone, smartphone, tablet, etc.) are forced to deal with unwanted telephone calls, SMS messages, emails from banks, health centers, insurance firms, beauty salons and other companies that use telemarketing for their work. Most of these companies implicitly specify the distribution of advertising through communication networks in the contract and thereby circumvent legal norms.

Telemarketing companies actively use intelligent bots that mimic the way people communicate. Robots determine the level of irritability and often tailor the conversation to mask the artificial origin of the conversation. Also, communication networks are often used by fraudsters to obtain sensitive information from a user (for example, credit card data, social security numbers, etc.).

To combat the abuses described, communication networks use mobile applications that identify numbers (for example, TrueCaller). In most cases, incoming calls are checked against a database of spam numbers, which is constantly updated based on feedback from users, and if the number of the spammer or fraudster exists in this database, the user is informed that the caller has been involved in fraudulent communications.

The situation is aggravated by the fact that it is now fairly easy to make phone calls anonymously or to disguise a phone number using number spoofing technology. Fraudsters are increasingly using this technology to call bank customers from the phone numbers of credit institutions and ask for the information they need to withdraw funds.

There are known methods for handling the task of recognizing automated telephone calls, but these known methods are not able to classify calls from fraudsters. In addition, in the most recent fraud schemes, number spoofing disadvantages the legal subscriber rather than the scammer. Blocking such numbers, for example, can result in banks losing the ability to reach their customers by telephone.

Therefore, there is a need for a method and a system of handling unwanted telephone calls including calls that use spoofed numbers.

SUMMARY

Aspects of the disclosure relate to information security, more specifically, to systems and methods of handling unwanted telephone calls including calls. For example, the method of the present disclosure may be use to perform early terminations of unwanted calls, such as spam calls or calls originated using spoofed numbers.

In one exemplary aspect, a method is provided for handling unwanted telephone calls, the method comprising: intercepting a call request for a call from a terminal device of a calling party to a terminal device of a called party, generating a call recording containing media data transmitted within a connection established by the intercepted call request, determining attributes of the generated call recording, classifying the call as an unwanted call based on the determined attributes, wherein the classification is performed by a classifier trained on previously collected unwanted calls, and wherein the call is classified as unwanted when the attributes belong to an unwanted call class that is known, and handling the call in accordance with the classification of the call, the handling including at least securing information of the call.

In one aspect, the call recording is generated over a specified time interval, wherein the time interval is specified based on: a multiple of a preset value; and/or a time interval equal to an interval at which a size of the media data that is contained is a multiple of the preset value.

In one aspect, the attribute of the generated call recording consists of at least one of: a set of words; a vector representation of words; and a multiset of words disregarding grammar and word order.

In one aspect, the attributes of the generated call recording are determined using an automatic speech recognizer.

In one aspect, the classes of the call include at least: the unwanted call class; and a genuine call class.

In one aspect, the call is classified as unwanted when the call is initiated by the calling party to carry out at least one of: a fraud; an obtaining of confidential information; and offering of goods that cause harm to health and/or development of the called party.

In one aspect, the classification is performed by the classifier trained using a call classification model and the previously collected unwanted calls.

In one aspect, an algorithm of the call classifier comprises at least an algorithm based on: Bayesian classifiers; a logistical regression; a Markov Random Field (MRF) classifier; a support vector machine; methods using nearest neighbors; and a decision tree.

In one aspect, the call classification model is trained on attributes of any number of previously classified calls, and wherein the class of the previously classified calls have been confirmed in such a way that a subsequent call is less likely to be incorrectly classified than a current call.

In one aspect, the call is handled at least by one of the following: an early termination of the call; and informing the called party that the call belongs to the unwanted call class.

According to one aspect of the disclosure, a system is provided handling unwanted telephone calls, the system comprising a hardware processor configured to: intercept a call request for a call from a terminal device of a calling party to a terminal device of a called party, generate a call recording containing media data transmitted within a connection established by the intercepted call request, determine attributes of the generated call recording, classify the call as an unwanted call based on the determined attributes, wherein the classification is performed by a classifier trained on previously collected unwanted calls, and wherein the call is classified as unwanted when the attributes belong to an unwanted call class that is known, and handle the call in accordance with the classification of the call, the handling including at least securing information of the call.

In one exemplary aspect, a non-transitory computer-readable medium is provided storing a set of instructions thereon for handling unwanted telephone calls, wherein the set of instructions comprises instructions for: intercepting a call request for a call from a terminal device of a calling party to a terminal device of a called party, generating a call recording containing media data transmitted within a connection established by the intercepted call request, determining attributes of the generated call recording, classifying the call as an unwanted call based on the determined attributes, wherein the classification is performed by a classifier trained on previously collected unwanted calls, and wherein the call is classified as unwanted when the attributes belong to an unwanted call class that is known, and handling the call in accordance with the classification of the call, the handling including at least securing information of the call.

The method and system of the present disclosure are designed to provide information security, in a more optimal and effective manner, enabling legitimate calls from legal subscribers to proceed to completion while performing early termination on unwanted calls.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 presents an example of a general purpose computer system on which aspects of the present disclosure can be implemented.

DETAILED DESCRIPTION

Exemplary aspects are described herein in the context of a system, method, and a computer program for handling unwanted telephone calls in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
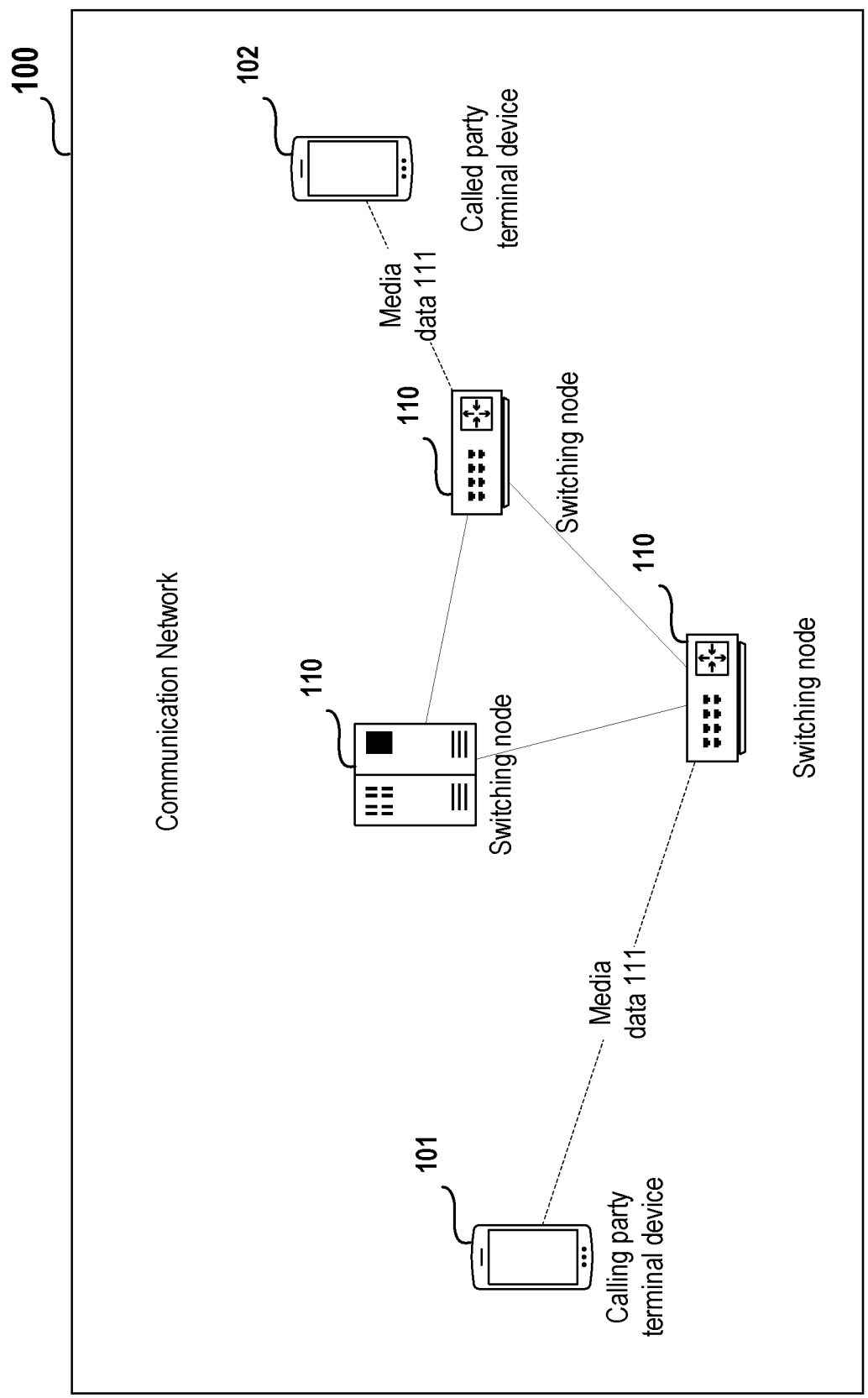
FIG. 1 illustrates an exemplary communications network.

FIG. 1 illustrates an exemplary communication network 100. The communication network 100 includes any number of calling party terminal devices 101, called party terminal devices 102, switching nodes 110, and media data 111. The communication network 100 is a system of physical communication channels and at least one switching node 110 that implements a media data 111 transfer protocol between the calling party's terminal device 101 and the called party's terminal device 102.

In one aspect, examples of communication networks include at least:
a computer network;
a telephone network; and
a mobile communication network.

A terminal device refers to an equipment designed to convert user information into media data 111 for transmission over communication channels and to implement the reverse conversion.

A call request refers to an attempt to establish a connection to the terminal device of the called party 102, initiated by the terminal device of the calling party 101.

A call or (a telephone call) refers to the process of transferring media data 111 between the calling party terminal device 101 and the called party terminal device 102 using the established connection.

In one aspect, the media data 111 consists of at least:
a media file; and
streaming data (media data transmitted in streaming mode).

For example, the calling party terminal device 101 and the called party terminal device 102 can be in the form of mobile phones of subscribers of a mobile network, where the telephone call is understood to mean a standard voice call.

Figure 2:
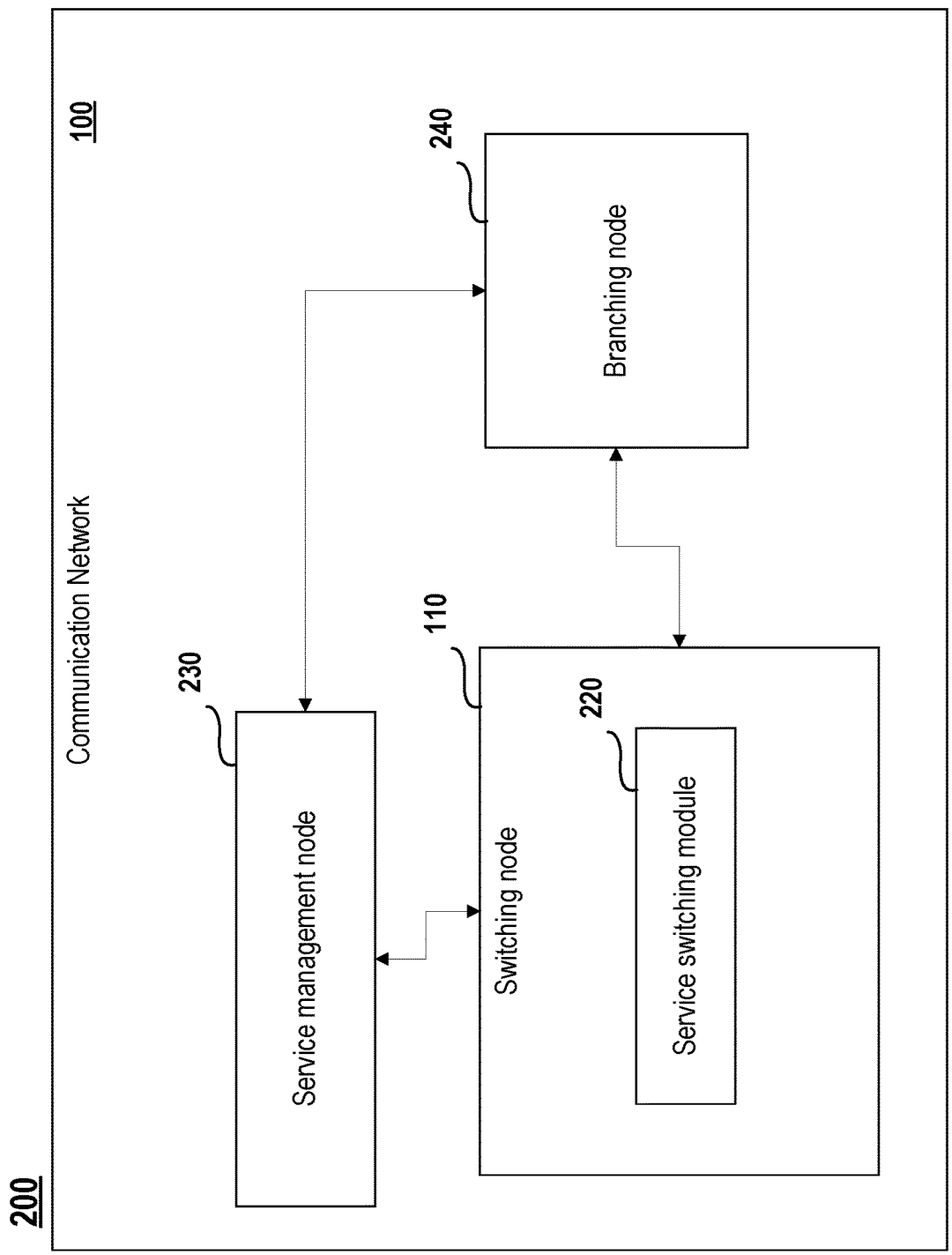
FIG. 2 a block diagram of an example of an intelligent network device based on a communication network.

FIG. 2 illustrates a block diagram of an example 200 of an intelligent network device based on a communication network 100. For instance, the block diagram of the example intelligent network device shown in FIG. 2 comprises the communication network 100 which includes: a switching node 110, a service switching module 220, a service management node 230, and a branching node 240. In one aspect, the service switching module 220 is implemented in the switching node 110.

The intelligent network of FIG. 2 allows additional communications services to be provided by upgrading at least one switching node 110 of the switching network 100. It does not matter that different switching equipment is used, since the architecture of the intelligent network is independent of the type of communications network 100.

In one aspect, the switching node 110 is used to perform functions for controlling delivery of basic services, and for equipping the service switching module 220. In one aspect, the service switching module 220 is used for initializing various call handling algorithms, implementing policies originated by the service management node 230, and monitoring the servicing of call requests in the intelligent network.

In one aspect, the service management node 230 is used for enabling services to be delivered across the entire intelligent network, thereby providing protocols for interaction with other elements of the network.

In one aspect, the intelligent network comprises a branching node 240 which is used for transferring a copy of media data 111 to other auxiliary elements of the intelligent network that make the intelligent network services more user-friendly (for example, a speech recognition device).

In one aspect, the services provided by the intelligent networks include at least:
free calling services;
services that allow reference information to be obtained free of charge;
televoting services, which allow voting by calling a specific number; and
provisions of telecommunications by using prepaid cards.

Figure 3:
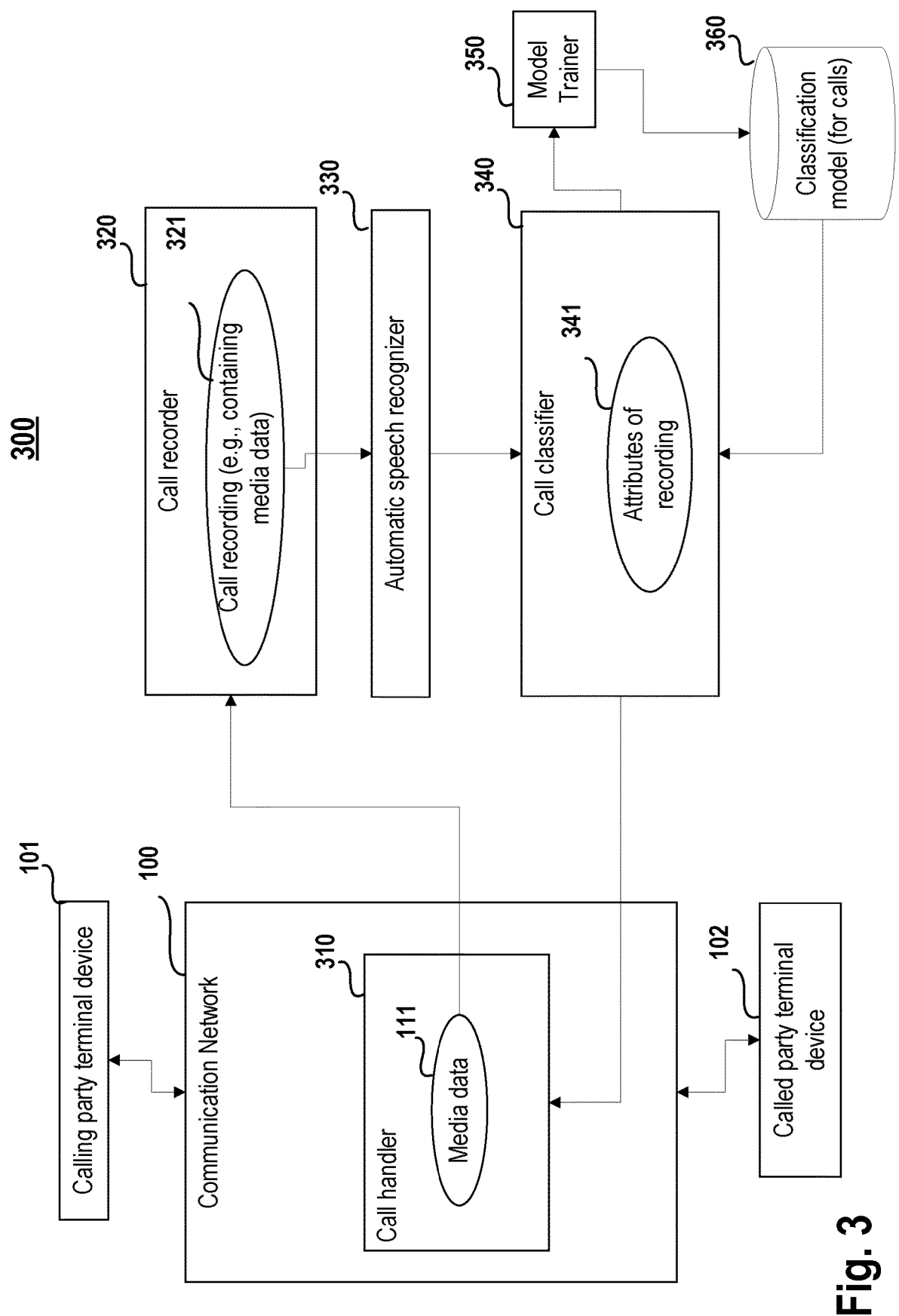
FIG. 3 illustrates a block diagram of a call management system for handling telephone calls.

FIG. 3 illustrates a block diagram of a call management system 300 for handling telephone calls, e.g., for handling unwanted telephone calls.

In one aspect, the block diagram of the call management system comprises a communication network 100, a calling party terminal device 101, a called party terminal device 102, a call handler 310, media data 111, a call recorder 320, a call recording 321 (e.g., containing media data of the call), an automatic speech recognizer 330, a call classifier 340, attributes of recording 341, a model trainer 350, and a classification model 360 for classifying calls.

In one aspect, the call handler 310 is designed to:
intercept a call in the communication network 100, wherein the call is initiated by the calling party terminal device 101 and is directed towards the called party terminal device 102,
transfer media data 111 to the call recorder 320, and
to handle the call based on the determined class of the call.

In one aspect, the communication network 100 takes the form of an intelligent network based on resources of public telephone networks. For example, the calling party terminal device 101 initiates a telephone call. After receiving the call request, the service switching module 220 (see FIG. 2) of the switching node 110 (see FIG. 2) determines that the connection requires switching to the service management node 230 (see FIG. 2). The switching node 110 establishes the corresponding connection.

The call handler 310 intercepts the call request and notifies the switching node 110 that the intercepted call needs to be routed through the branching node 240 (see FIG. 2), which establishes a connection via two different communication channels: the first channel with the terminal device of the called party 102, and the second channel with the call recorder 320.

Once the connection is established, the media data 111 from each of the terminal devices 101 and 102 is transferred through the branching node 240 where it is duplicated. One data stream is directed towards the receiving party and the other data stream is directed to the call recorder 320. Then, the call recording is performed. For example, a recording of the call containing the media data is formed as shown in 321. This continues until the call is completed.

In one aspect, the switching node 110 cannot establish a connection to the called party terminal device 102, for at least one of the following reasons:
the called party terminal device 102 responds with an "busy" signal;
the called party terminal device 102 is not available;
a connection error occurred; and
the called party terminal device 102 responds by refusing to accept the connection.

When, the switching node 110 cannot establish a connection to the called party terminal device 102, the call handler 310 sends a signal to the switching node 110 indicating that the intercepted call needs to be routed to the call recorder 320.

The call recorder 320 is designed to record the media data 111 transmitted throughout the duration of the connection, and to direct at least one generated call recording 321 to the automatic speech recognizer 330, where the call recording 321 is in the form of a media file.

In one aspect, the call recorder 320 generates a recording of the call 321 for a specified time interval, where the time interval is specified by means of at least one of the methods:
a multiple of a preset value; and
equal to a value at which the size of the media data contained is a multiple of the preset size.

In one example, the time interval for recording of the call is specified as a multiple of a preset value. For instance, suppose the preset value is 30 seconds, then, the time interval may be set as a multiple of 30 seconds. In another example, a preset size of media data is set instead of a preset value for a time time interval. Then, the time interval is set such that it is equal to an interval at which the contained media data is a multiple of the preset size of media data.

The automatic speech recognizer 330 is designed to convert the call recording 321 obtained from the call recorder 320 into digital information suitable for analysis (such as formatted text).

In one aspect, the conversion of the call recording 321, by the automatic speech recognizer 330, comprises:
splitting the media file into fragments;
performing, for each fragment, a series of transformations to obtain coefficients describing frequency characteristics of the fragment; and
for each fragment, based on the obtained coefficients, determining with a certain probability the part of a phoneme to which the fragment belongs.

In one aspect, the automatic speech recognizer 330 is additionally trained on a corpus of pre-selected texts to recognize the sequences of probable phonemes. In one aspect, if necessary, the automatic speech recognizer 330 restores unrecognized words by their meaning, based on the context and available statistics. Then, the data obtained during the recognition of phonemes and the chains of phonemes are combined, and the automatic speech recognizer 330 determines the most likely sequence of words.

For example, for two equally likely phonemes "a" and "o" in the word "rocket", the automatic speech recognizer 330 will conclude that the most probably used phoneme in the word is "o", since during training it often met the sequence "space rocket" and rarely the sequence "space racket".

In one aspect, at the final stage numeric values are converted into digits, and certain punctuation marks (for example, hyphens) are placed. This converted text is the final result of the recognition that is passed to the call classifier 340.

The call classifier 340 is designed to decide whether a call recording 321 belongs to an unwanted class based on the analysis of the content of the call recording 321 performed by the automatic speech recognizer 330 using the trained classification model 360.

In one aspect, the classes of the calls include at least:
an "unwanted call class", for classifying calls that are unwanted; and
a "genuine call class", for classifying calls that are wanted.

In one aspect, calls are assigned to the unwanted call class if they were initiated by the calling party to carry out at least one of:
a fraud;
an obtaining of confidential information; and
making a spam call.

The call classifier 340 converts the call recording 321 processed by the automatic speech recognizer 330 into a set of attributes 341 suitable for classification.

In one aspect, the attributes 341 of the recording consist at least:
a set of words (n-grams);
a vector representation of words (word-embedding); and
a multiset of words disregarding grammar and word order (bag-of-words).

In one aspect, attributes of calls belonging to a known class of calls (for example, unwanted, unknown, etc.) are collected in advance. Based on the collected data, the classification model 360 is trained in such a way that calls with similar attributes can be classified by the aforementioned classification model 360 with accuracy greater than a specified value.

Using the classification model 360, the call classifier 340 classifies the call recording 321 processed by the automatic speech recognizer 330.

In one aspect, the classification algorithm comprises at least one of the following:
- Bayesian classifiers (naive Bayesian classifier);
- logistical regression;
- Markov Random Field (MRF) classifier;
- support vector machine (SVM);
- methods based on nearest neighbors (k-nearest neighbor); and
- a decision tree.

For example, the classification model 360 of the call classifier 340 is trained on a large number of recordings of fraudulent calls, where under different pretexts (data verification, financial transactions) attackers request certain items of personal information, such as bank account numbers or passwords. In the process, each fraudulent call recording is represented as a set of attributes. Then, a phrase such as "report password from SMS", present in the call recording 321 processed by the automatic speech recognizer 330 in the form of a set of attributes, will allow the call classifier 340 to assign the call recording 321 processed by the automatic speech recognizer 330 to the unwanted class with a certain probability.

The call classifier 340 classifies the phone call as unwanted and notifies the call handler 310. The call may then be handled according to the classification.

In one aspect, handling of the call, by the call handler 310, comprises at least: terminating the call early and/or informing the called party that the call belongs to the unwanted call class.

In one aspect, the handling of the call further comprises notifying the user about the interception of a call, and providing to the user the determined call class after it has been terminated. For example, the notification may be performed via an application such as, the Kaspersky Who Calls application, which may be used to notify the user about the interception of a call and to provide the call class to the user.

In one aspect, the model trainer 350 is designed to train the classification model 360 based on new data. For example, if the decision by the classification model 360 proves to be false, the user of the terminal device can override the class of the call that is determined by the system 300. The model trainer 350 will then train the classification model 360 based on the user feedback such that, for subsequent calls classified using the classification model 360, the probability of a correct determination of the call class will increase.

Figure 4:
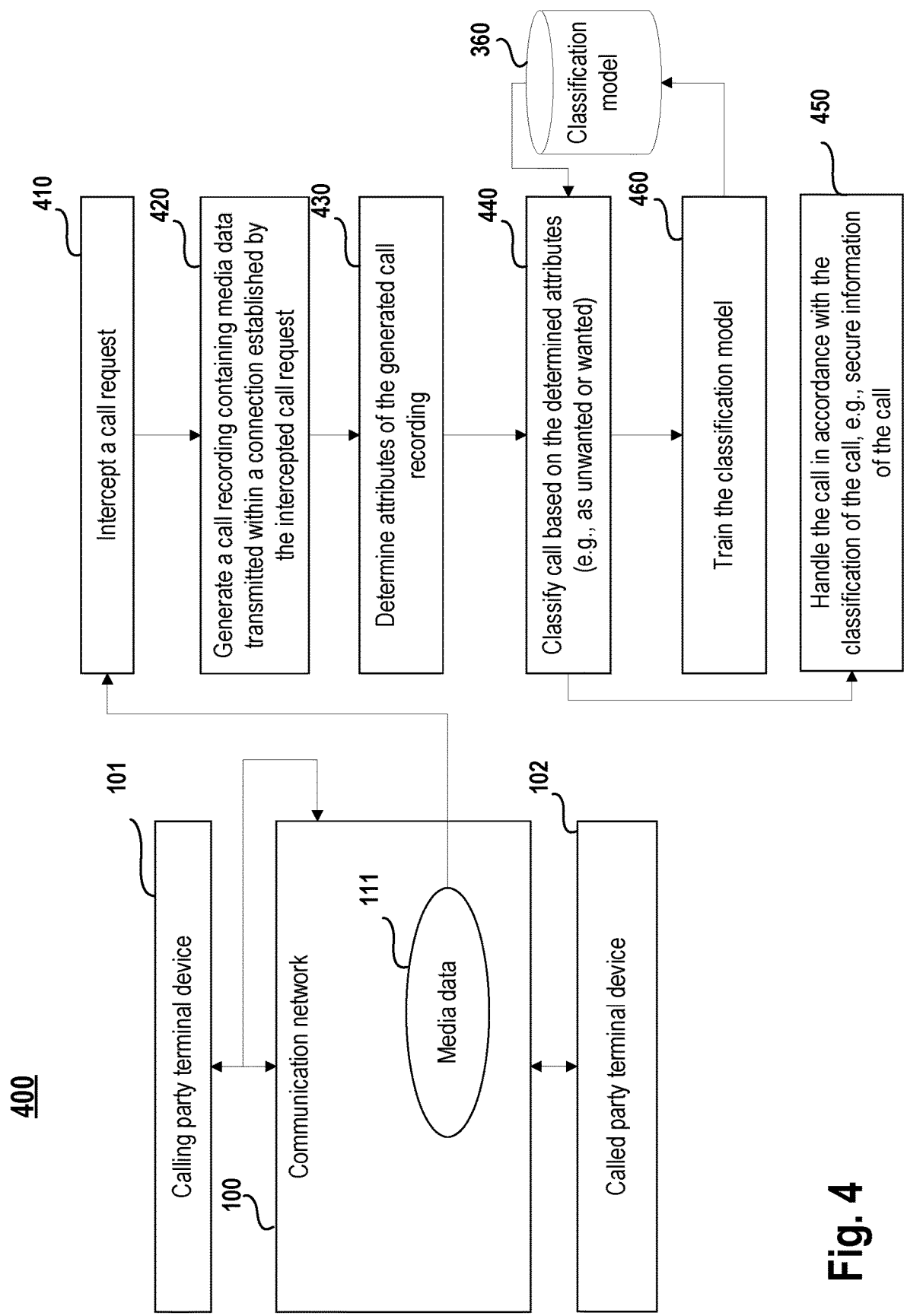
FIG. 4 illustrates a method handling telephone calls.

FIG. 4 illustrates a method 400 for handling unwanted telephone calls. In one aspect, method 400 is performed in the network of the carrier via any number of devices of the carrier network. In one aspect, the method 400 for handling calls starts in step 410.

In step 410, method 400, intercepts a call request from the calling party terminal device 101 to the called party terminal device 102. For example. the interception may be carried out in the network of the carrier.

In step 420, by the call recorder 320, method 400 generates a call recording 321. The call recording contains media data transmitted within a connection established by the intercepted call request.

In step 430, by the automatic speech recognizer 330 and the call classifier 340, method 400 determines attributes of the call recording 321 that is generated in step 420.

In step 440, by the classifier 340, method 400 classifies the call based on the attributes determined in step 430. For example, the call may be classified as an unwanted call. In another example, the call may be classified as a genuine call (i.e., a wanted call). The classification is performed by a classifier trained on previously collected unwanted calls. The call is classified as unwanted when the attributes belong to an unwanted call class.

In one aspect, the call is classified as unwanted when the call is initiated by the calling party to carry out at least one of: a fraud; an obtaining of confidential information; and offering of goods that cause harm to health and/or development of the called party. For example, there may be goods that are categorized as harmful or as undesirable. For instance, the goods may be banned for sale in online stores and cannot be advertised online. Such products include, for example, dietary supplements (e.g., Biologically active additives). Telemarketing is actively used to distribute such products. There may also be a category of goods that may not or cannot be offered to minors.

In step 450, by the call handler 310, method 400 handles the call in accordance with the classification of the call. In one aspect, the handling of the call includes at least securing information of the call—thereby providing information security for the call.

In one aspect, in step 460, method 400 trains the classification model 360 using the model trainer 350.

In one aspect, the classification model 360 is trained and retrained iteratively to improve the accuracy of the classification. Thus, subsequent iterations provide improvements in accuracy of the classification model used in previous iterations.

FIG. 5 is a block diagram illustrating a computer system 20 on which aspects of systems and methods for handling unwanted telephone calls may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for handling unwanted telephone calls, the method comprising:
   intercepting a call request for a call from a terminal device of a calling party to a terminal device of a called party;
   generating a call recording containing media data transmitted within a connection established by the intercepted call request, wherein the call recording is generated over a specified time interval at which a size of the media data is a multiple of a preset value;
   determining attributes of the generated call recording;
   classifying the call as an unwanted call based on the determined attributes, wherein the classification is performed by a classifier trained on previously collected unwanted calls, and wherein the call is classified as unwanted when the attributes belong to an unwanted call class that is known; and
   handling the call in accordance with the classification of the call, the handling including at least securing information of the call.

2. The method of claim 1, wherein an attribute of the generated call recording consists of at least one of:
   a set of words;
   a vector representation of words; and
   a multiset of words disregarding grammar and word order.

3. The method of claim 1, wherein the attributes of the generated call recording are determined using an automatic speech recognizer.

4. The method of claim 1, wherein classes of the call include at least:
   the unwanted call class; and
   a genuine call class.

5. The method of claim 1, wherein the call is classified as unwanted when the call is initiated by the calling party to carry out at least one of:
   a fraud;
   an obtaining of confidential information; and
   offering of goods that cause harm to health and/or development of the called party.

6. The method of claim 1, wherein the classification is performed by the classifier trained using a call classification model and the previously collected unwanted calls.

7. The method of claim 1, wherein an algorithm of the call classifier comprises at least an algorithm based on:
   Bayesian classifiers;
   a logistical regression;
   a Markov Random Field (MRF) classifier;
   a support vector machine;
   methods using nearest neighbors; and
   a decision tree.

8. The method of claim 1, wherein the call classification model is trained on attributes of any number of previously classified calls, and wherein the class of the previously classified calls have been confirmed in such a way that a subsequent call is less likely to be incorrectly classified than a current call.

9. The method of claim 1, wherein the call is handled at least by one of the following:
   an early termination of the call; and
   informing the called party that the call belongs to the unwanted call class.

10. A system for handling unwanted telephone calls, comprising:
    at least one processor configured to:
       intercept a call request for a call from a terminal device of a calling party to a terminal device of a called party;
       generate a call recording containing media data transmitted within a connection established by the intercepted call request, wherein the call recording is generated over a specified time interval at which a size of the media data is a multiple of a preset value;
       determine attributes of the generated call recording;
       classify the call as an unwanted call based on the determined attributes, wherein the classification is performed by a classifier trained on previously collected unwanted calls, and wherein the call is classified as unwanted when the attributes belong to an unwanted call class that is known; and
       handle the call in accordance with the classification of the call, the handling including at least securing information of the call.

11. The system of claim 10, wherein an attribute of the generated call recording consists of at least one of:
    a set of words;
    a vector representation of words; and
    a multiset of words disregarding grammar and word order.

12. The system of claim 10, wherein the attributes of the generated call recording are determined using an automatic speech recognizer.

13. The system of claim 10, wherein classes of the call include at least:
   the unwanted call class; and
   a genuine call class.

14. The method of claim 10, wherein the call is classified as unwanted when the call is initiated by the calling party to carry out at least one of:
   a fraud;
   an obtaining of confidential information; and
   offering of goods that cause harm to health and/or development of the called party.

15. The system of claim 10, wherein the classification is performed by the classifier trained using a call classification model and the previously collected unwanted calls.

16. The system of claim 10, wherein an algorithm of the call classifier comprises at least an algorithm based on:
   Bayesian classifiers;
   a logistical regression;
   a Markov Random Field (MRF) classifier;
   a support vector machine;
   methods using nearest neighbors; and
   a decision tree.

17. The system of claim 10, wherein the call classification model is trained on attributes of any number of previously classified calls, and wherein the class of the previously classified calls have been confirmed in such a way that a subsequent call is less likely to be incorrectly classified than a current call.

18. A non-transitory computer readable medium storing thereon computer executable instructions for handling unwanted telephone calls, including instructions for:
   intercepting a call request for a call from a terminal device of a calling party to a terminal device of a called party;
   generating a call recording containing media data transmitted within a connection established by the intercepted call request, wherein the call recording is generated over a specified time interval at which a size of the media data is a multiple of a preset value;
   determining attributes of the generated call recording;
   classifying the call as an unwanted call based on the determined attributes, wherein the classification is performed by a classifier trained on previously collected unwanted calls, and wherein the call is classified as unwanted when the attributes belong to an unwanted call class that is known; and
   handling the call in accordance with the classification of the call, the handling including at least securing information of the call.

* * * * *